United States Patent Office 2,925,433
Patented Feb. 16, 1960

2,925,433
PROCESS FOR THE PREPARATION OF DINITROACETATES

Charles O. Parker, Huntsville, Ala., assignor to Rohm & Haas Company, Philadelphia, Pa., a corporation of Delaware No Drawing. Application March 6, 1956
Serial No. 569,942

10 Claims. (Cl. 260—465)

This invention concerns a process for preparing esters of dinitroacetic acid and salts thereof. According to the process of this invention an ester of dinitrocyanoacetic acid $$NC \cdot C(NO_2)_2COOR$$

is reacted with hydrogen chloride or bromide in the presence of an alcohol, best in solution in an anhydrous ether, to form an intermediate which is converted with aqueous hydrochloric or hydrobromic acid to the compound $$H \cdot C(NO_2)_2COOR$$

This compound can be reacted with a metal hydroxide, a quaternary ammonium hydroxide, or an amine, or ammonia, or a salt to form the compound $$M \cdot C(NO_2)_2COOR$$

In these formulas R is a lower alkyl, nitroalkyl, nitratoalkyl, nitrobenzyl, chlorobenzyl, or cyanobenzyl group. M is an equivalent of a metal, particularly an alkali or alkaline earth metal, or an ammonium ion.

The esters of dinitroacetic acid are stable when they are prepared by the process of this invention. Many of the esters can be safely distilled under reduced pressure, exhibiting relatively high thermal stability. These properties are in contrast to those of the ethyl ester of this structure reported in the literature. This ester was made by another method and exhibited instability as thus prepared. The metal salts can be crystallized in most cases and are also comparatively stable.

The starting esters, $NC \cdot C(NO_2)_2COOR$, may be obtained by the process described in my copending application Serial No. 569,944 filed March 6, 1956.

In accordance with the method there described oximinocyanoacetates, $NC \cdot C(NOH)COOR$, are reacted below about 20° C. with nitric acid, best in the form of so-called mixed acid, wherein nitric acid and sulfuric acid are present. In the preferred procedure an alkyl, nitroalkyl, nitratoalkyl, haloalkyl, cycloalkyl, nitrobenzyl, chlorobenzyl, or cyanobenzyl oximinocyanoacetate is added slowly with stirring to mixed acid in the cold. The reaction may be completed as the reaction mixture is warmed up. Layers are allowed to form and are separated. The organic layer is washed free of acid. The product thus obtained is an ester of dinitrocyanoacetic acid, which may be purified if desired as by distillation. For many purposes this ester may be used in the somewhat crude form as obtained. There may thus be prepared methyl, ethyl, propyl, isopropyl, nitropropyl, nitrobutyl, nitratoethyl, chlorobutyl, bromoethyl, cyclohexyl, cyclopentyl, methylcyclohexyl, nitrobenzyl, and like esters of dinitrocyanoacetic acid.

One of the esters of dinitrocyanoacetic acid is treated with hydrogen chloride or bromide, preferably in excess, in the presence of an anhydrous lower non-tertiary alkanol, preferably methanol, although ethanol, propanol, isopropyl alcohol, butanol, sec-butanol, or isobutyl alchol can be used. There is also used an anhydrous ether as a solvent. The dialkyl ethers having alkyl groups of not over four carbon atoms each are particularly convenient to use, ethyl ether being the most common of these. Other types of ethers may, however, be used including tetrahydrofuran and dioxane.

A mixture of an alkanol and an ether is treated with dry hydrogen chloride or bromide, that is a hydrogen halide having a molecular weight from 36 to 81, by passing one of these in gaseous form into a chilled mixture of alkanol and ether. An ester of dinitrocyanoacetic acid is added thereto. The resulting mixture is left standing at a low temperature, usually between —10° and 20° C. until reaction in the mixture is well advanced. This generally requires 10 to 24 hours. Conveniently the mixture of alkanol, ether, ester, and hydrogen halide is allowed to stand overnight, 12 to 16 hours thus elapsing and yields of the final product then being good.

The amount of lower alkanol used is at least equivalent to the amount of ester, is preferably used in a ratio of about 2 moles of alkanol per mole of ester, and may be used in excess of this amount. Thus ratios of one to four or more moles of alkanol per mole of ester can be used. The proportion of solvent used may be even more varied. Usually 10 to 20 moles of ether are used per mole of ester.

In the preferred procedure the mixture of ester, alkanol, solvent, and hydrogen halide which has been left standing is treated with water. An amount of water is used which is at least equivalent to the ester taken and may desirably be from one to two moles per mole of ester. Temperature used in this step may be from 20° to 50° C.

The mixture to which water has been added is stirred and/or left standing until reactions have occurred to an extent to give a satisfactory yield of the desired final product. At the temperatures used here of 20° to 50° C. a period of five hours to one hour is usually sufficient to ensure such yield.

Excess water is now added to the reaction mixture and the system is extracted with an inert volatile, water-insoluble organic solvent, such as methylene dichloride. Layers are allowed to form. The aqueous layer is extracted again, as with methylene dichloride, to improve the yield.

An alternative procedure which can be used is to distill off excess alcohol solvent, and hydrogen halide under reduced pressure after these have been reacted as above. The residue resulting is treated with water and a strong inorganic acid, concentrated hydrochloric or hydrobromic acid being satisfactory.

There are several steps which can be used for isolating the dinitroacetic acid ester from the extract. In some cases it is satisfactory to evaporate the solvent under reduced pressure and obtain the desired ester as residue. This may be purified by distillation under low pressure to give a useful and satisfactory product.

When the dinitroacetate ester contains no alkali sensitive group other than the acidic hydrogen attached to the carbon atom carrying the nitro groups, the esters may be converted to a water-soluble salt and thus separated from the extract.

For example, a solution of sodium carbonate may be agitated with the methylene dichloride extract. The sodium salt of the ester is formed and taken up in the water layer. After the layers have been separated, the water layer is acidified with an inorganic acid. The ester in hydrogen form is then liberated and can readily be taken up in a volatile inert, water-immiscible solvent such as ethylether or methylene dichloride. The resulting extract can be dried over conventional drying agents, such as magnesium sulfate, calcium sulfate, or sodium sulfate. Quite pure materials thus result. If desired, the dried product may be distilled under reduced pressure. The products are stable to storage.

The esters may be converted to their salt form by treatment with a metal hydroxide or under suitable conditions by metathesis with a metal salt including double decomposition methods. Thus, the esters may be titrated with a solution of lithium, sodium, potassium, rubidium, or cesium hydroxides to yield the alkali metal salts. Again, they may be reacted with a solution of calcium, strontium or barium hydroxide. In many cases carbonates may be used in the same way, even though some are insoluble and must be used in aqueous suspension. Magnesium hydroxide or basic carbonate can be used in the same way. Hydroxides of other metals may likewise be used. Any of the above soluble salts may be treated in solution with a soluble salt of heavy metal giving an insoluble salt of dinitroacetic acid, which salt can be filtered off, washed, and dried. In this way there can readily be formed the copper, nickel, silver, or mercury or other metal salt.

Melting points of typical salts of methyl dinitroacetate are for the ammonium salt 173°–173.5° C., sodium salt 212° C., potassium salt 213.5°–214° C., and silver 168°–170° C., and of ethyl dinitroacetate are for the sodium salt 179.5°–180° C., potassium salt 186° C., and the silver 138° C.

The esters $H \cdot C(NO_2)_2COOR$, may also be converted to a salt form by treatment with a basic nitrogen compound. Such compounds include ammonia or ammonium hydroxide, quatenary ammonium hydroxides, or amines. Typical quaternary ammonium hydroxides are tetramethyl, benzyltrimethyl, dibenzyldimethyl, trimethylhydroxyethyl, trimethyl(nitratoethyl), propargyltrimethyl, propargyldimethyl(cyanomethyl), butyltrimethyl, and benzyltriethyl ammonium compounds.

Typical amines are alkylamines, including methyl, dimethyl, trimethyl amines, ethyl amines, butyl amines, tert-octylamine, allylamine, cyclopentylamine, cyclohexylamine, dicyclohexylamine, aniline, N-methylaniline, dimethylaniline, benzylamine, benzyldimethylamine, morpholine, piperidine, pyrrolidine, piperazine, ethylenediamine, propylenediamine, tetramethylethylenediamine, guanidine, hydrazine, etc.

Illustrative examples of preparing dinitroacetates follow. Parts therein are by weight unless otherwise designated.

*Example 1*

A solution was made from 40.6 parts of ethyl dinitrocyanoacetate in 400 parts of absolute ethyl ether and while this solution was chilled by an ice bath, dry hydrogen chloride was passed in. When the temperature had been reduced from 10° C. to 2° C., addition of 60 parts of dry ethanol was made, this alcohol having been freshly distilled from magnesium. Addition of dry hydrogen chloride was continued to saturation. The resulting solution was left standing for 16 hours at about 30° C. The reaction mixture was then subjected to distillation until the pot temperature reached 50° C. A small quantity of a white solid formed during this time. The mixture was then subjected to distillation under reduced pressure to give a residue. This was taken up with about twice its volume of methylene chloride. The solution formed was washed with cold water three times and the solution dried over magnesium sulfate. At this point solvent was removed and the residue was distilled. After a small forerun at 56°–62° C./0.15 mm., some distillate crystallized in the condenser. The distillate was treated with an equal volume of concentrated hydrochloric acid at 0°–5° C. The organic material was taken up in methylene chloride. This solution was washed with cold water, dried over magnesium sulfate, and distilled. The main fraction taken at 50°–54° C./0.05 mm. amounted to 15.1 parts. This product had a neutral equivalent of 177 and corresponded in composition to ethyl dinitroacetate, for which the theoretical neutral equivalent is 178.

In the same way there may be taken other alkyl dinitrocyanoacetates and by reaction with hydrogen chloride or bromide in a lower alkanol converted to the corresponding alkyl dinitroacetates.

One of the characteristics of these is their capacity to form salts by replacement of the hydrogen on the methinyl carbon. Thus, there may be formed the lithium, sodium, potassium, or other alkali metal salt by reaction with an alkali metal hydroxide, or the alkaline earth metal salts in like manner from the alkaline earth hydroxides, or an ammonium salt by treating with a basic nitrogen compound.

For example, to 10 parts of ethyl dinitroacetate there was added about an equivalent amount of potassium hydroxide dissolved in ethanol. A bright yellow potassium salt formed. It was filtered off and recrystallized from ethanol. It melted at 187° C. with decomposition. This salt is useful as a component of propellant mixtures.

Upon treatment with a strong acid this salt can be reconverted to ethyl dinitroacetate.

*Example 2*

There were mixed 200 parts of absolute ethyl ether and 100 parts of dry methanol. The mixture was saturated with dry hydrogen chloride with the temperature being lowered to about 5° C. Thereupon 100 parts of methyl dinitrocyanoacetate was added with stirring and cooling to maintain the temperature at 5° C. The mixture was then left standing for 16 hours. Addition was made of 50 parts of water with stirring with the temperature still held low. The mixture was then allowed to warm up to room temperature and left standing for an hour. About 500 parts of water at about 15° C. was added and the mixture was stirred. About 150 parts of methylene dichloride was added, the mixture was agitated, and layers allowed to form. These were separated and the aqueous layer reextracted with 150 parts of methylene dichloride. The total methylene dichloride extract was treated with 106 parts of anhydrous sodium carbonate dissolved in water. Layers were separated. The sodium carbonate solution was acidified with concentrated hydrochloric acid and 100 parts of concentrated sulfuric acid was added. The acid solution was treated with two 150 part portions of methylene dichloride. These portions were combined and dried over magnesium sulfate. The solvent was evaporated to yield a residue of 71.5 parts of liquid. This was distilled at 38° C./0.02 mm. to give 66.7 parts of pure methyl dinitroacetate. This product was colorless. It was a stable compound, remaining colorless for a long period of time.

*Examle 3*

There were mixed 100 parts of methanol and 200 parts of ethyl ether. The mixture was cooled to 5° C. and dry hydrogen chloride was passed in. While hydrogen chloride was still being passed in, 101.5 parts of ethyl dinitrocyanoacetate was slowly added with stirring. The temperature was maintained between 0° and 5° C. overnight. Then 100 parts of water was added. The temperature was allowed to rise to about 30° C. and the mixture left standing for another hour. The mixture was stirred into 1500 parts of water and the diluted mixture extracted three times with 100 part portions of methylene dichloride. The methylene dichloride extracts were combined and washed with cold water. The washed extracts were dried over sodium sulfate and the solvent was removed under reduced pressure. This left 82.2 parts of residue, which was ethyl dinitroacetate, as established by analytical data, including infrared analysis. It has a refractive index, $N_D^{20}$, of 1.4336.

The above procedure when repeated with substitution of butanol for the ethanol and/or isopropyl ether for the ethyl ether leads to the identical product.

Example 4

There were mixed 9 parts of methanol and 70 parts of ethyl ether. The mixture was chilled and treated as above with hydrogen chloride at 0° to 5° C. There was slowly added 10 parts of n-butyl dinitrocyanoacetate with addition of more hydrogen chloride. The mixture was left standing 20 hours at about 5° C. and worked up as in the previous examples. There was obtained 8.7 parts of n-butyl dinitroacetate. This had a refractive index, $N_D^{20}$, of 1.4417.

This material was taken up in 20 parts of ethanol and treated with a solution of 3 parts of potassium hydroxide dissolved in 50 parts of ethanol. A yellow solid formed which was recrystallized from water. It melted at 169°–170° C. and was the potassium salt of butyl dinitroacetate, $K \cdot C(NO_2)_2COOC_4H_9$.

Example 5

A mixture of 100 parts of ether and 7 parts of methanol was saturated at 5° C. with hydrogen chloride. There was added cyclohexyl dinitrocyanoacetate in an amount of 7.1 parts. The mixture was processed in the same way as in the previous examples. Cyclohexyl dinitroacetate was obtained as a residue. The infrared spectrum showed the typical absorption bands for dinitroacetate esters.

This product was dissolved in ethanol and neutralized as above with a solution of potassium hydroxide in ethanol. The potassium salt, $K \cdot C(NO_2)_2COOC_6H_{11}$, melted at 226°–227° C. with decomposition. The ultimate analysis of this material was close to theory.

Example 6

In the same way a mixture of 100 parts of ethyl ether and 17 parts of methanol was saturated with hydrogen chloride in the cold and treated with 17.5 parts of 2-nitratoethyl dinitrocyanoacetate. This mixture was processed as above and the product, 2-nitratoethyl dinitroacetate, was obtained as a residue in an amount of 12.8 parts.

This was neutralized in ethanol with 3.4 parts of potassium hydroxide in ethanol to give a yellow solid, melting at 152.5° C. with decomposition.

Repetition of the above procedure with substitution of 2-nitrobutyl dinitrocyanoacetate leads to the corresponding 2-nitrobutyl dinitroacetate, from which metal and ammonium salts can be prepared in the ways shown above.

Example 7

By the procedure used in previous examples 120 parts of ethyl ether and 30 parts of methanol were mixed and treated in the cold (0°–5° C.) with hydrogen chloride. Three was slowly added 53.2 parts 2-bromoethyl dinitrocyanoacetate, as above. The procedural steps were as in previous examples except that the extraction with sodium carbonate solution was omitted. Instead the solvent was evaporated and the residue distilled with a falling film molecular still, the walls being at 115° C./0.09 mm. The distilate had a refractive index of 1.4900 ($N_D^{20}$). This product corresponded in composition to $$BrCH_2CH_2OOC \cdot C(NO_2)_2 \cdot H$$

The compounds prepared by the process of this invention, particularly the metal salts of the dinitroacetate esters, are useful as components of propellant mixtures, helping to control the burning rates thereof. They can be added to such a propellant mixture as that formed by mixing nitroglycerin with nitrocellulose. A 3:4 (by weight) mixture of these was treated with 10% of the potassium salt of methyl dinitroacetate.

This composition had a burning rate in a strand burner of 0.94 inch per second at 1000 p.s.i.g. The double base propellant had a burning rate of 0.7 inch per second at 1000 p.s.i.g. With 10% of ethyl dinitroacetate in the form of the potassium salt the burning rate was 0.9 inch per second at 1000 p.s.i.g. Other salts can likewise be used to modify the burning rate of propellants.

I claim:

1. A process for preparing esters of dinitroacetic acid and the salts thereof which comprises reacting an ester of dinitrocyanoacetic acid, $NC \cdot C(NO_2)_2COOR$, with a hydrogen halide of a molecular weight from 36 to 81 in the presence of at least a chemically equivalent amount of a lower non-tertiary alkanol and a volatile ether at a temperature between —10° C. and 20° C., reacting the resulting mixture with water between 20° and 50° C., and separating a dinitroacetate of the formula $$H \cdot C(NO_2)_2COOR$$

R being a member of the class consisting of alkyl, nitroalkyl, nitratoalkyl, chloroalkyl, and bromoalkyl groups of not over four carbon atoms, cycloalkyl, and nitrobenzyl groups.

2. A process for preparing esters of dinitroacetic acid and salts thereof which comprises reacting an ester of the formula $NC \cdot C(NO_2)_2COOR$ with hydrogen chloride in a mixture of at least a chemically equivalent amount of a lower non-tertiary alkanol and a dialkyl ether with alkyl groups of not over four carbon atoms each at a temperature between —10° and 20° C., reacting the resulting mixture with water between 20° and 50° C. and extracting from the reaction mixture a dinitroacetate of the formula $H \cdot C(NO_2)_2COOR$, R being a member of the class consisting of alkyl, nitroalkyl, nitratoalkyl, chloroalkyl, and bromoalkyl groups of not over four carbon atoms, cycloalkyl, and nitrobenzyl groups.

3. A process for preparing esters of dinitroacetic acids and salts thereof which comprises reacting an ester of the formula $NC \cdot C(NO_2)_2COOR$ with hydrogen chloride in a mixture of a lower non-tertiary alkanol in a proportion at least equivalent to said ester and a dialkyl ether with alkyl groups of not over four carbon atoms each in a proportion of at least ten moles per mole of said ester at a temperature between about —10° C. and about 20° C., reacting the resulting mixture with water between about 20° and 50° C., then adding an excess of water, and separating an ester of the formula $H \cdot C(NO_2)_2COOR$, R being a member of the class consisting of alkyl, nitroalkyl, nitratoalkyl, chloroalkyl, and bromoalkyl groups of not over four carbon atoms, cycloalkyl, and nitrobenzyl groups.

4. A process according to claim 3 in which the alkanol is methanol.

5. A process according to claim 4 in which the ether is ethyl ether.

6. A process for preparing methyl dinitroacetate which comprises reacting methyl dinitrocyanoacetate with hydrogen chloride in a mixture of methanol in a proportion of one to four moles per mole of methyl dinitrocyanoacetate and of ethyl ether in a proportion of 10 to 20 moles per mole of methyl dinitrocyanoacetate at a temperature between about —10° and 20° C., reacting the resulting mixture with water between about 20° and 50° C., and separating methyl dinitroacetate.

7. A process for preparing ethyl dinitroacetate which comprises reacting ethyl dinitrocyanoacetate with hydrogen chloride in a mixture of methanol in a proportion of one to four moles per mole of methyl dinitrocyanoacetate and of ethyl ether in a proportion of 10 to 20 moles per mole of methyl dinitrocyanoacetate at a temperature between about —10° and 20° C., reacting the resulting mixture with water between about 20° and 50° C., and separating ethyl dinitroacetate.

8. A process for preparing 2-bromoethyl dinitroacetate which comprises reacting 2-bromoethyl dinitrocyanoacetate with hydrogen chloride in a mixture of methanol in a proportion of one to four mole per mole of 2-bromoethyl dinitrocyanoacetate and of ethyl ether in a proportion of 10 to 20 moles per mole of 2-bromoethyl dinitrocyanoacetate at a temperature between about —10° and 20° C., reacting the resulting mixture with water between about 20° and 50° C., and separating 2-bromoethyl dinitroacetate.

9. A process for preparing nitratoethyl dinitroacetate which comprises reacting nitratoethyl dinitrocyanoacetate with hydrogen chloride in a mixture of methanol in a proportion of one to four moles per mole of nitratoethyl dinitrocyanoacetate and of ethyl ether in a proportion of 10 to 20 moles per mole of nitratoethyl dinitrocyanoacetate at a temperature between about —10° and 20° C., reacting the resulting mixture with water between about 20° and 50°, and separating nitratoethyl dinitroacetate.

10. A process for preparing cyclohexyl dinitroacetate which comprises reacting cyclohexyl dinitrocyanoacetate with hydrogen chloride in a mixture of methanol in a proportion of one to four moles per mole of cyclohexyl dinitrocyanoacetate and of ethyl ether in a proportion of 10 to 20 moles per mole of cyclohexyl dinitrocyanoacetate at a temperature between about —10° and 20° C., reacting the resulting mixture with water between about 20° and 50° C., and separating cyclohexyl dinitroacetate.

No references cited.